United States Patent
Pazhyannur et al.

(10) Patent No.: US 9,107,151 B2
(45) Date of Patent: Aug. 11, 2015

(54) WIRELESS SYSTEM WITH SPLIT CONTROL PLANE AND DATA PLANE

(71) Applicant: CISCO TECHNOLOGY, INC., San Jose, CA (US)

(72) Inventors: Rajesh S. Pazhyannur, Fremont, CA (US); Balachander Chandrasekaran, San Ramon, CA (US); Sudhir Jain, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 228 days.

(21) Appl. No.: 13/837,219

(22) Filed: Mar. 15, 2013

(65) Prior Publication Data

US 2014/0269535 A1 Sep. 18, 2014

(51) Int. Cl.
*H04W 40/24* (2009.01)
*H04W 36/08* (2009.01)

(52) U.S. Cl.
CPC ........ *H04W 40/24* (2013.01); *H04L 2212/0025* (2013.01); *H04W 36/08* (2013.01)

(58) Field of Classification Search
None
See application file for complete search history.

(56) References Cited

U.S. PATENT DOCUMENTS

| | | | | |
|---|---|---|---|---|
| 7,505,343 | B2 * | 3/2009 | Kang | 365/205 |
| 8,804,732 | B1 * | 8/2014 | Hepting et al. | 370/392 |
| 2007/0064673 | A1 * | 3/2007 | Bhandaru et al. | 370/351 |
| 2008/0155252 | A1 * | 6/2008 | Nambiar | 713/153 |
| 2011/0019582 | A1 | 1/2011 | Okmyanskiy et al. | |
| 2012/0106523 | A1 * | 5/2012 | Anumala et al. | 370/338 |
| 2013/0124707 | A1 * | 5/2013 | Ananthapadmanabha et al. | 709/223 |
| 2013/0272135 | A1 * | 10/2013 | Leong | 370/241 |
| 2014/0092884 | A1 * | 4/2014 | Murphy et al. | 370/338 |
| 2014/0204746 | A1 * | 7/2014 | Sun et al. | 370/235 |

OTHER PUBLICATIONS

"OpenFlow: Enabling Innovation in Campus Networks", Nick McKeown et al., Mar. 14, 2008.

* cited by examiner

*Primary Examiner* — Brian Roberts
(74) *Attorney, Agent, or Firm* — Cindy Kaplan

(57) ABSTRACT

In one embodiment, a method includes identifying an access point joining a wireless controller in communication with a switch, establishing a control tunnel between the access point and the wireless controller, transmitting an address of the switch from the wireless controller to the access point, and requesting the switch to setup a data tunnel with the access point. An apparatus and logic are also disclosed herein.

20 Claims, 9 Drawing Sheets

WIRELESS SYSTEM WITH SPLIT CONTROL PLANE AND DATA PLANE

TECHNICAL FIELD

The present disclosure relates generally to wireless networks, and more particularly, to control plane and data plane operation.

BACKGROUND

The desire to create software defined networks (SDNs) may result in a large change in the switching industry. For example, in one configuration of SDNs, the network control plane can be physically decoupled from the data forwarding plane.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
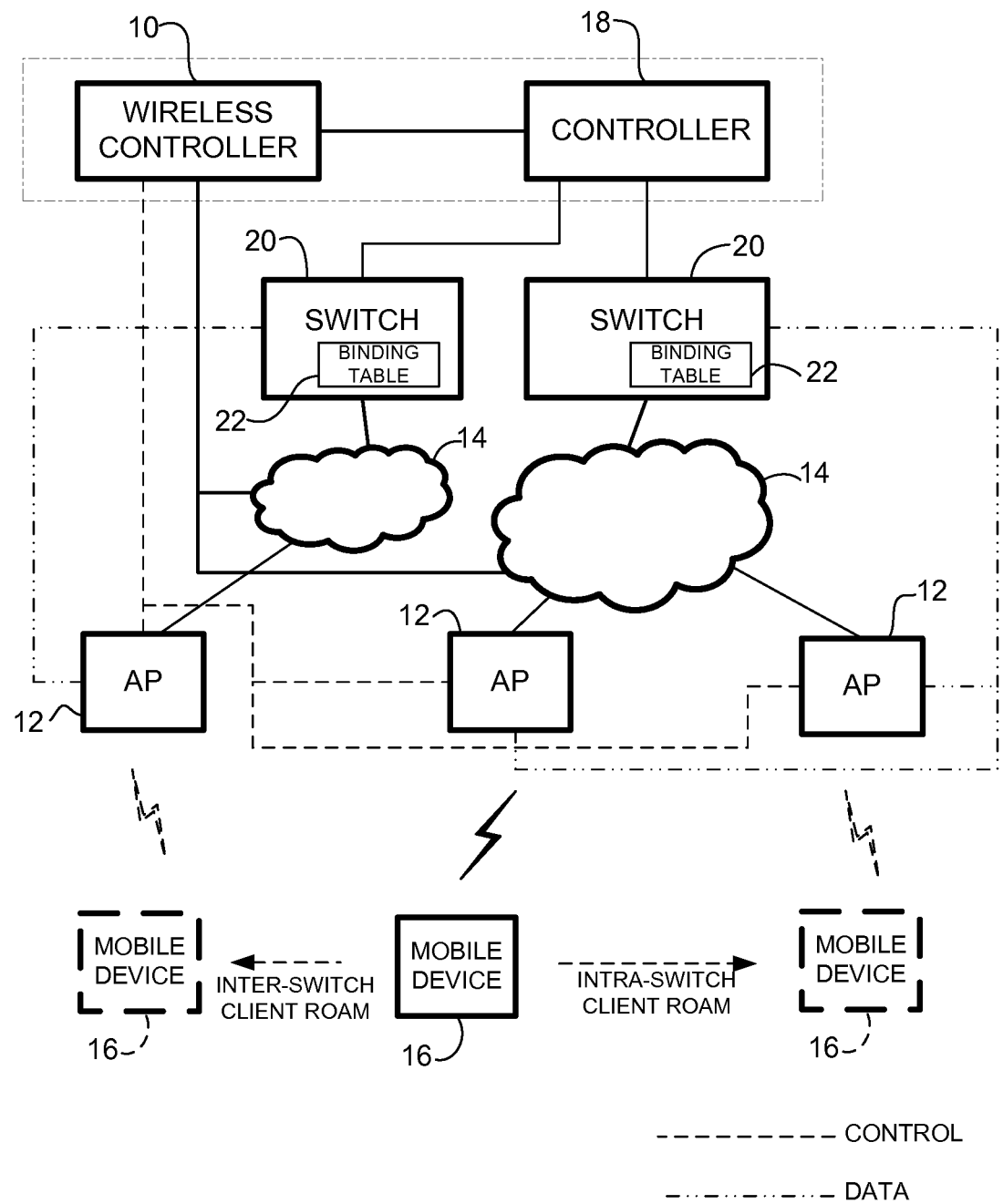
FIG. 1 illustrates an example of a network in which embodiments described herein may be implemented.

In one embodiment, a method generally comprises identifying an access point joining a wireless controller in communication with a switch, establishing a control tunnel between the access point and the wireless controller, transmitting an address of the switch from the wireless controller to the access point, and requesting the switch to setup a data tunnel with the access point.

In another embodiment, an apparatus generally comprises a processor for processing instructions received at a switch from a wireless controller to setup a data tunnel with an access point joining the wireless controller, storing a tunnel identifier for the data tunnel, and associating a mobile device with the tunnel identifier. The apparatus further comprises memory for storing a binding table comprising a list of mobile devices in communication with the switch and data tunnels for use in communication with the mobile devices. Control packets are transmitted on a control tunnel between the wireless controller and the access point.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In a conventional network switch, packet forwarding (data path) and routing decisions (control path) occur on the same device. It may be desired to split the control plane and data plane. For example, there may be cases, such as with software defined networks, in which the control plane hardware can be physically decoupled from the data plane hardware. OpenFlow is one example of a protocol that enables the splitting of the control plane and data plane in a wired network. The data path portion still resides on the switch, while high-level routing decisions are moved to a separate device (e.g., controller, server). The OpenFlow switch and controller communicate via the OpenFlow protocol, which defines messages such as packet-received, send-packet-out, modify-forwarding-table, and get-stats.

The decoupling of the control plane and data plane allows for the control plane to be implemented using a different distribution model than the data plane. Also, it allows the control plane development and runtime environment to be on a different platform than the traditionally low-powered management CPUs (central processing units) found on hardware switches and routers. OpenFlow also enables networks with a centralized control and distributed data plane, and allows the control plane and data plane to be scaled independently.

Conventional wireless systems have an integrated control plane and data plane. The same physical enclosure of a wireless controller handles both control plane and data plane to and from access points (APs) in the wireless system. Conventional wireless systems therefore cannot take advantage of the benefits provided by a split control plane and data plane.

The embodiments described herein provide a wireless system that leverages a protocol such as OpenFlow to achieve a split control plane/data plane system. The wireless system includes a wireless controller and switch configured to coordinate the split control and data planes in the wireless system. This allows an access point to have a control plane tunnel to the wireless controller and a data plane tunnel to the switch. Splitting of the control and data planes provides scalability benefits along with other benefits discussed above for a split control/data plane system. As described in detail below, one or more embodiments provide tunnel encapsulation, bridging, intra-switch mobility, inter-switch mobility, and DHCP proxy support.

Referring now to the drawings, and first to FIG. 1, an example of a network in which embodiments described herein may be implemented is shown. For simplification, only a small number of nodes are shown. A wireless controller 10 is in communication with a plurality of access points (APs) 12 via networks 14. The APs 12 may be in communication with any number of mobile devices (clients) 16 via a wireless network (e.g., WLAN (wireless local area network)). The wireless controller 10 is also in communication with a controller 18 (referred to herein as an 'OpenFlow controller' or 'switch controller'), which is in communication with switches 20 (referred to herein as 'OpenFlow switches').

In the example shown in FIG. 1, two APs are in communication with one switch and another AP is in communication with a different switch. The wireless controller 10 and switches 20 may communicate with the APs 12 via one or more networks 14 or any number or type of network devices. The switches 20 may be in communication with any number of access points 12. The access points 12 may be in communication with any number of mobile devices 16, which may move (roam) between access points.

The mobile device (client, station) 16 may be any suitable equipment that supports wireless communication, including for example, a mobile phone, personal digital assistant, portable computing device, laptop, tablet, multimedia device, or any other wireless device. The mobile device 16 and access point 12 are configured to perform wireless communication according to a wireless network communication protocol such as IEEE 802.11/Wi-Fi. As described in detail below, the mobile device 16 may roam between APs 12 in communication with the same switch 20 (intra-switch roam) or roam between APs in communication with different switches (inter-switch roam).

In order to provide a separate data plane and control plane, the AP 12 is operable to setup tunnels to different end points (one for control plane and one for data plane). As indicated by the control and data lines shown in FIG. 1, each AP 12 has a control plane tunnel to the wireless controller 10 and a data plane that is terminated on the OpenFlow switch 20. Details of a process for setting up the control plane and data plane tunnels are described below.

The wireless controller 10 may be in communication with one or more networks (e.g., Internet, intranet, local area network, wireless local area network, cellular network, metropolitan area network, wide area network, satellite network, radio access network, public switched network, virtual local area network, virtual private network, or any other network or combination thereof). Communication paths between the wireless controller 10 and networks or between the wireless controller and access points 12 may include any number or type of intermediate nodes (e.g., routers, switches, gateways, or other network devices), which facilitate passage of data between network devices.

The term 'wireless controller' as used herein may refer to a wireless LAN (local area network) controller, mobility controller, wireless control device, wireless control system, or any other network device operable to perform control functions for a wireless network. The network may also include a wireless control system or other platform for centralized wireless LAN planning, configuration, and management. The wireless controller 10 enables system wide functions for wireless applications and may support any number of access points 12. The wireless controller 10 may be, for example, a standalone device or a rack-mounted appliance. The wireless controller 10 may also be a virtual device located in a network or cloud, for example.

The wireless controller 10 and OpenFlow controller 18 may be integrated at a physical network device or may be physically independent devices located remote from one another. The wireless controller 10 and OpenFlow controller 18 may both be virtual machines, or one of the controllers may be a virtual machine and the other a physical device. An integrated wireless controller 10 containing an embedded OpenFlow controller 18 is indicated by the phantom box enclosing both devices in FIG. 1.

The OpenFlow controller 18 is in communication with the OpenFlow switch 20 over a secure channel that connects the switch to the controller and allows commands and packets to be sent between the controller and switch using a protocol (e.g., OpenFlow protocol), which provides a way for the controller to communicate with the switch.

It is to be understood that OpenFlow is only an example of a protocol that may be used for communication between the controller 18 and switch 20 and that other communication protocols may be used, without departing from the scope of the embodiments. The term 'OpenFlow' is used herein to distinguish the controller 18 in communication with the switch from the wireless controller 10. The term 'OpenFlow controller' or 'OpenFlow switch' as used herein may refer to devices configured for utilizing the OpenFlow protocol or other suitable protocols.

The switch 20 may be any network device operable to provide switching functions. The switch 20 includes a data structure comprising a list of established AP tunnels. The tunnels may be identified, for example, by a unique tunnel identifier, destination (AP) IP address, destination (AP) UDP (User Datagram Protocol) port number, source IP address/source UDP port number, or any other identifier or combination thereof. In order to provide client mobility, the switch 20 maintains a data structure 22, referred to herein as a binding table. The binding table 22 maps clients to tunnels so that the OpenFlow switch 20 can maintain a per-client binding. In one example, the binding table comprises a binding update list as shown in Table I below.

TABLE I

| CLIENT | TUNNEL |
|---|---|
| Client Address (IP/MAC address) | Downstream Interface/Upstream Interface (AP Tunnel ID, Inter-switch Tunnel ID/ VLAN ID, Inter-switch Tunnel ID) |

The binding table 22 includes an entry for each client associated with the switch 20. Each entry includes a client identifier and tunnels mapped to the client. The client may be identified, for example, by client MAC (Media Access Control) address, client IP (Internet Protocol) address (e.g., IPv4, IPv6), or both. The tunnel field includes a downstream interface (also referred to as an inbound interface) to the client (e.g., an AP tunnel identifier or an inter-switch tunnel identifier) and an upstream interface (also referred to as an outbound interface) (e.g., VLAN identifier or inter-switch tunnel identifier). The downstream interface corresponds to the associated AP tunnel and the upstream interface is the one assigned to the client.

The term 'downstream' as used herein refers to the flow of traffic from the switch 20 towards the mobile device 16. The term 'upstream' as used herein refers to the flow of traffic from the mobile device 16.

The downstream (inbound) tunnel may also be a QinQ (Ethernet packet within an Ethernet packet) tunnel. This may be used, for example, when the AP 12 can be directly reached by the switch 20 in a layer 2 (L2) network. In one example, the control tunnel that terminates at the controller 10 is an IP/UDP (User datagram Protocol) tunnel, and the data tunnel is IP/UDP or QinQ tunnel.

As described below, in the case of an inter-switch roam, one of the interfaces may be associated with an inter-switch tunnel. It is to be understood that the data structure shown above and the fields described herein are only examples and that other data structures, formats, fields, or identifiers may be used without departing from the scope of the embodiments.

Figure 9:
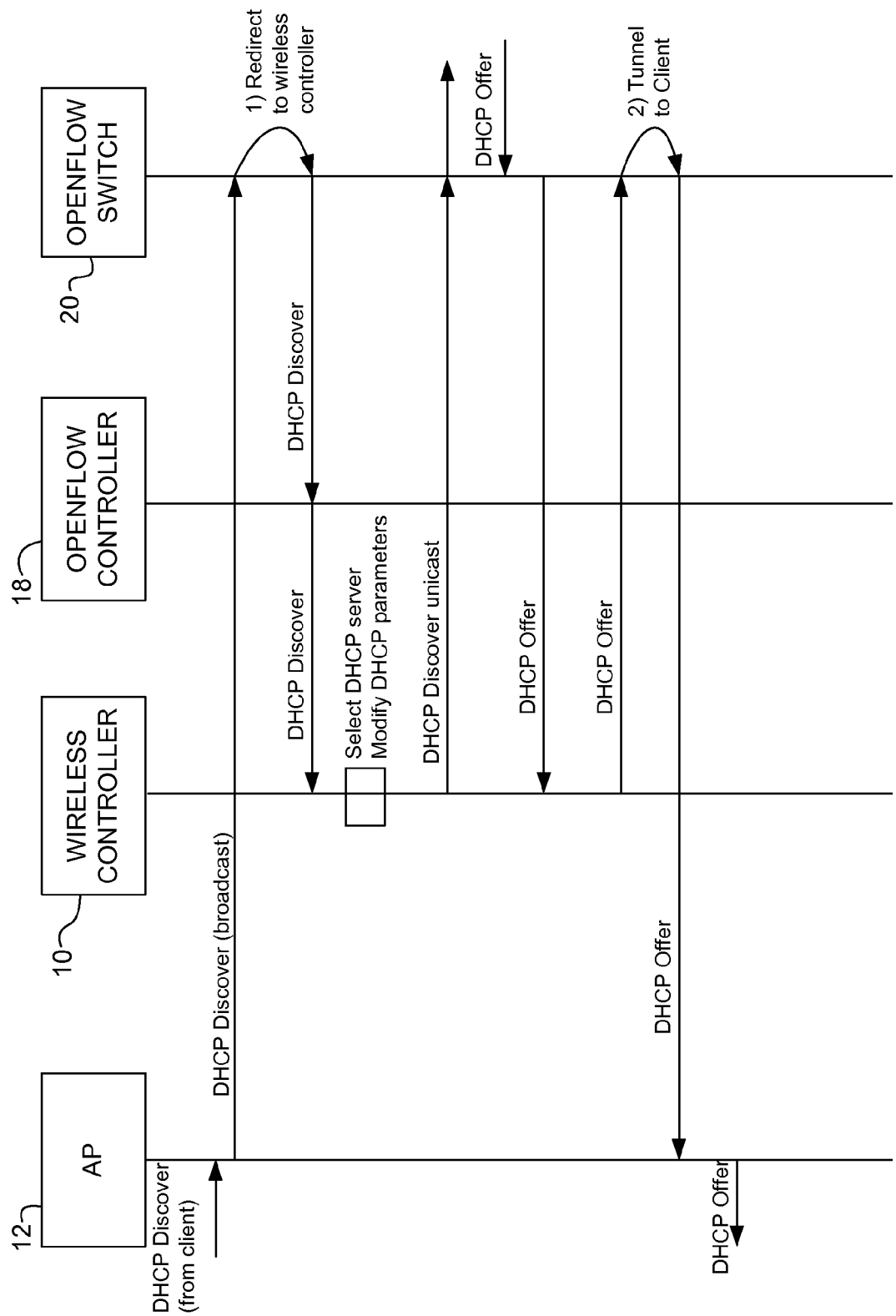
FIG. 9 is a diagram illustrating interaction between components of the wireless system for DHCP (Dynamic Host Configuration Protocol) proxy support, in accordance with one embodiment.

In one embodiment, the OpenFlow switch 20 is configured to route (hairpinning as shown in FIG. 9) all DHCP (Dynamic Host Configuration Protocol) packets to the wireless controller 10, as described below. This ensures that the wireless controller 10 becomes aware of the assigned IP addresses for the clients 16.

In one embodiment, the access point 12 transmits IEEE 802.11 frames to the OpenFlow switch 20. In this case, the OpenFlow switch 20 performs an IEEE 802.11 to IEEE 802.3 bridging function. In this example, the client 16 transmits 802.11 frames to the AP 12 and the AP transmits 802.11 frames encapsulated in a tunnel, as described above, to the OpenFlow switch 20, which then transmits 802.3 frames. In another embodiment, the AP 12 transmits 802.3 frames to the OpenFlow switch 20, in which case, the switch would not need to perform an 802.11 to 802.3 bridging function. In this example, the switch will do bridging with the assumption that the tunnel port is a point to multipoint port with respect to clients. Thus, the packet from the client 16 to the switch 20 can go back to the same tunnel to the AP 12 for another client on the same AP.

As noted above and described in detail below, the system utilizes tunneling. In one embodiment, the control plane between the wireless controller 10 and AP 12 comprises a CAPWAP (Control and Provisioning of Wireless Access Points) tunnel. The tunnel between the AP 12 and switch 20 may also comprise a CAPWAP tunnel. It is to be understood that CAPWAP is only one example and that other protocols may be used.

In the case of inter-switch mobility, another tunnel may be implemented between switches 20 (old switch in communication with mobile device 16 before client roam and new switch in communication with mobile device after client roam). In one embodiment, an EoIP (Ethernet over Internet Protocol) tunnel is used for communication between the switches 20. CAPWAP (Control and Provisioning of Wireless Access Points) may also be used.

It is to be understood that the network shown in FIG. 1 and described herein is only an example and that other networks having different components or configurations may be used, without departing from the scope of the embodiments. For example, as noted above, there may be any number of APs 12 in communication with the wireless controller 10 for supporting any number of mobile devices 16. There may also be any number of switches 20 in communication with the wireless controller via OpenFlow controller 18. It should be noted that the switch 20 does not have to be directly connected to the AP 12.

Figure 2:
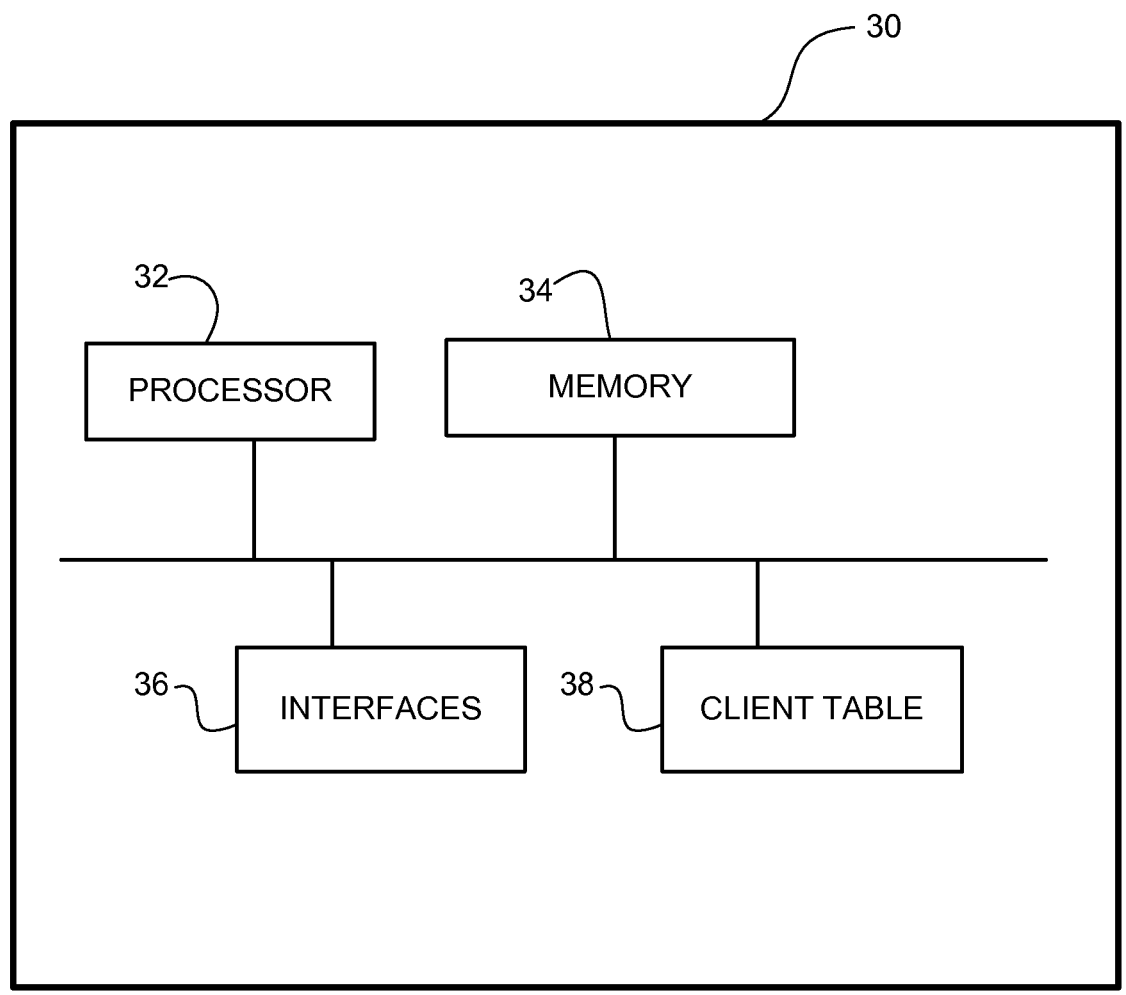
FIG. 2 depicts an example of a network device useful in implementing embodiments described herein.

FIG. 2 illustrates an example of a network device 30 (e.g., wireless controller 10, switch 20) that may be used to implement the embodiments described herein. In one embodiment, the network device 30 is a programmable machine that may be implemented in hardware, software, or any combination thereof. The network device 30 includes one or more processor 32, memory 34, network interfaces 36, and client table 38 (e.g., binding table 22 at switch 20, client information at wireless controller 10).

Memory 34 may be a volatile memory or non-volatile storage, which stores various applications, operating systems, modules, and data for execution and use by the processor 32. Memory 34 may include, for example, client table 38.

Logic may be encoded in one or more tangible media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interfaces 36 may comprise any number of interfaces (linecards, ports) for receiving data or transmitting data to other devices. The network interface 36 may include, for example, an Ethernet interface for connection to a computer or network.

It is to be understood that the network device 30 shown in FIG. 2 and described above is only an example and that different configurations of network devices may be used. For example, the network device 30 may further include any suitable combination of hardware, software, algorithms, processors, devices, components, or elements operable to facilitate the capabilities described herein.

Figure 3:
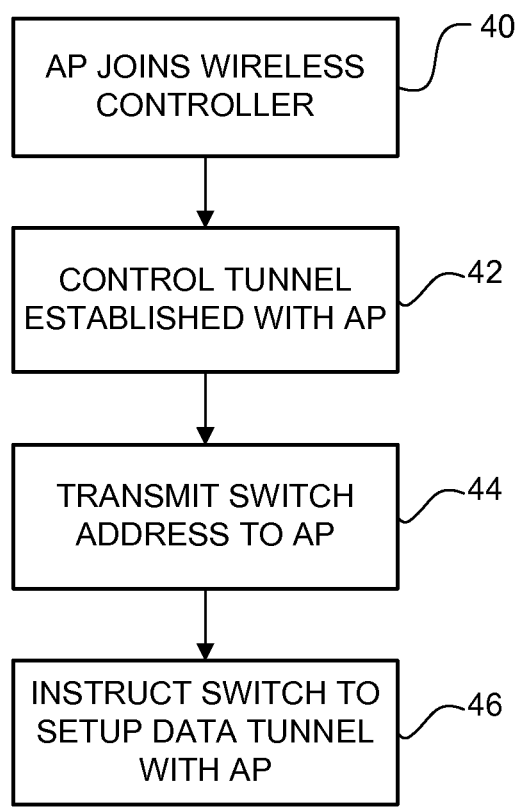
FIG. 3 is a flowchart illustrating an overview of a process for split control plane and data plane operation at a wireless controller, in accordance with one embodiment.

FIG. 3 is a flowchart illustrating an overview of a process for split control plane and data plane operation at the wireless controller 10, in accordance with one embodiment. At step 40, the access point 12 joins the wireless controller 10 (wireless controller identifies the access point). A control tunnel is established between the wireless controller 10 and the access point 12 (step 42). Since the data tunnel is setup between the access point 12 and the switch 20, the wireless controller 10 responds to the access point with the switch address (e.g., IP address) (step 44). The wireless controller 10 requests the OpenFlow controller 18 to have the switch 20 setup a data tunnel with the AP 12 (step 46). The switch 20 thus activates the AP tunnel at the end of a successful AP join at the wireless controller 10. The request is transmitted via the OpenFlow controller (switch controller) 18. The switch 20 stores a list of tunnel identifiers for the data tunnels and mobile devices 16 associated with the data tunnels for use in switching traffic to and from the mobile devices.

Figure 4:
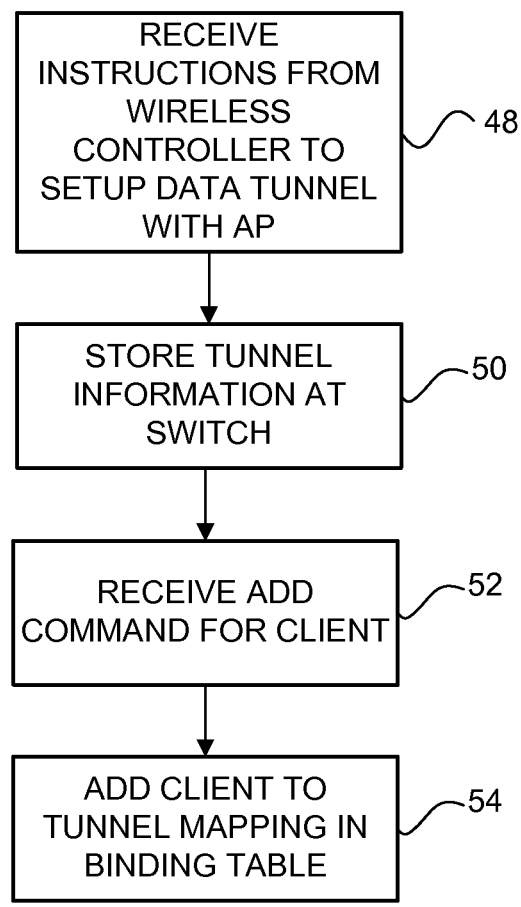
FIG. 4 is a flowchart illustrating an overview of a process for split control plane and data plane operation at a switch, in accordance with one embodiment.

FIG. 4 is a flowchart illustrating an overview of a process for split control plane and data plane operation at the switch 20, in accordance with one embodiment. At step 48, the switch 20 receives instructions from the wireless controller 10 to setup a data tunnel with the access point 12. The switch 20 stores tunnel information (step 50). When the switch 20 receives an add command for a mobile device 16, the switch adds the mobile device to the binding table 22 (steps 52 and 54). Upon receiving a packet for the client 16, the switch 20 retrieves the upstream identifier and either bridges it locally or tunnels the packet. Upon receiving a packet from the client 16, the switch 20 retrieves the downstream identifier and tunnels the packet to the corresponding AP 12.

It is to be understood that the processes illustrated in FIGS. 3 and 4, and described above are only examples and that steps may be modified, deleted, added, reordered, or combined without departing from the scope of the embodiments.

As described in detail below, a number of extensions are provided to separate the control and data planes in the wireless system. The extensions are configured to provide tunnel encapsulation, intra-switch client mobility, inter-switch client mobility, and DHCP relay/proxy support.

Figure 5:
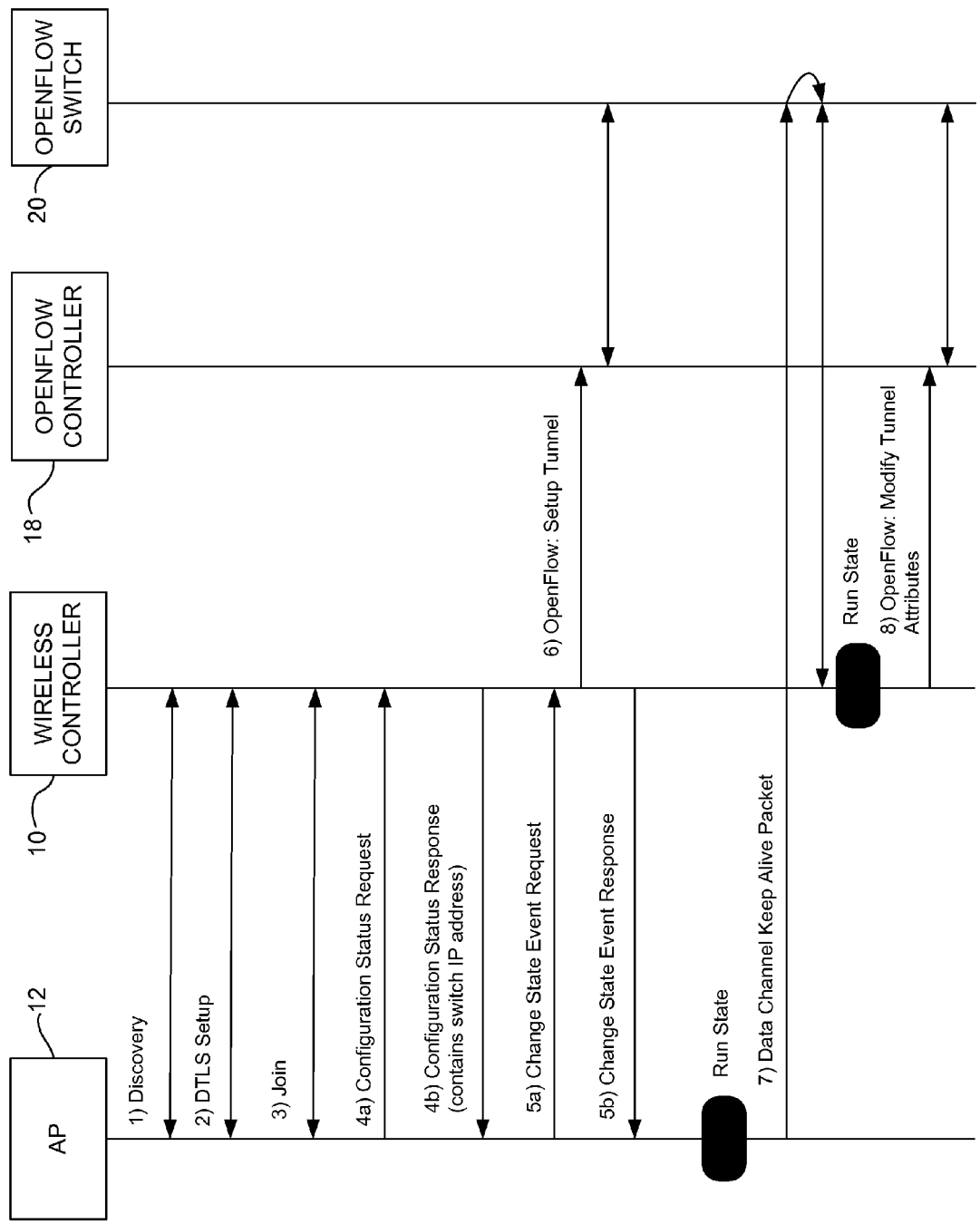
FIG. 5 is a diagram illustrating interaction between components of a wireless system during an access point join process, in accordance with one embodiment.

FIG. 5 illustrates interactions between the wireless controller 10, access point 12, OpenFlow controller 18, and OpenFlow switch 20 during an AP join process, in accordance with one embodiment. As with conventional systems, the access point 12 discovers the wireless controller 10 and sets up a control tunnel (e.g., CAPWAP control tunnel). However, as previously described, the data tunnel is setup with the OpenFlow switch 20. The data tunnel setup is coordinated with the AP join process as illustrated in FIG. 5. Step 1 is discovery between the AP 12 and wireless controller 10. Step 2 is DTLS (Datagram Transport Layer Security) setup. The AP joins the WLC at step 3. The access point 12 sends a configuration status request to the wireless controller 10 at step 4*a* and the wireless controller responds at step 4*b*. The response contains the switch IP address. The AP 12 is provided the IP address of the switch since unlike conventional deployments, the data tunnel is not terminated on the wireless controller 10, but instead on a different element (switch 20). In step 5*a*, the AP 12 transmits a change state event request to the wireless controller 10 and the wireless controller responds at step 5*b*. The wireless controller informs the OpenFlow switch 20 via the OpenFlow controller 18 to setup a data tunnel to the newly joined AP (step 6). As previously described, the switch 20 maintains a list of established AP tunnels to ensure that packets can be switched to or from the tunnels. At step 7, the AP 12 transmits a data channel keep alive packet. The wireless controller 10 may also modify tunnel attributes (step 8). This information is transmitted to the OpenFlow switch 20 by the OpenFlow controller 18.

Figure 6:
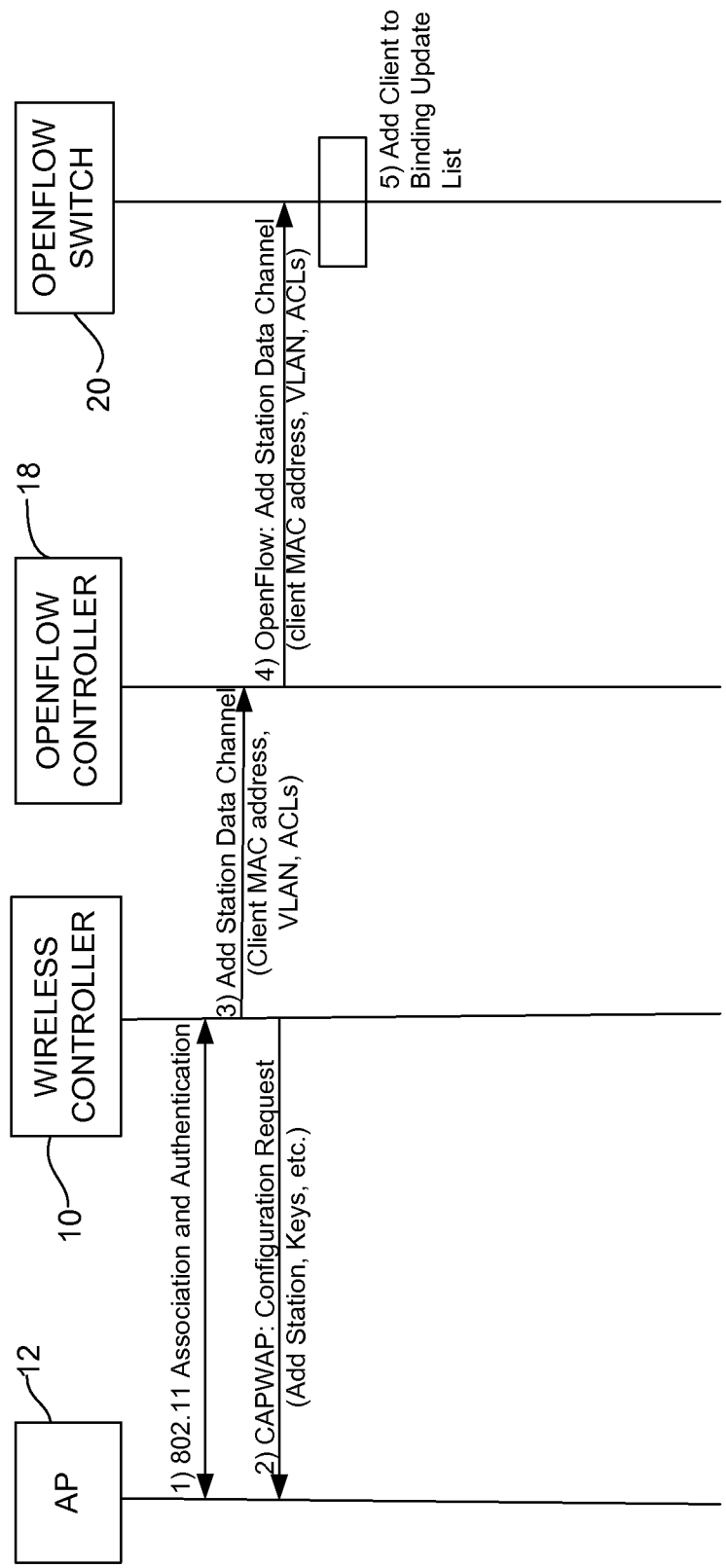
FIG. 6 is a diagram illustrating interaction between components of the wireless system during a client join process, in accordance with one embodiment.

FIG. 6 illustrates interactions between system components during a client join, in accordance with one embodiment. IEEE 802.11 association and authentication is performed between the AP 12 and wireless controller 10 at step 1. The wireless controller 10 sends a CAPWAP configuration request to the AP 12 at step 2. Upon completing 802.11 association and authentication, the wireless controller 10 requests the switch 20 to setup a data channel via the OpenFlow controller 18 (steps 3 and 4). The request may include, for example, client MAC address, VLAN (virtual local area network), ACLs (access control lists), QoS policy, or any other policies associated with the client. The switch 20 adds the client to its binding table 22 (step 5). This involves updating the table to ensure downstream packet processing, thus ensuring that packets for this client can be associated with corresponding data tunnel, as well as upstream packet processing, which allows packets from this client to be bridged. The downstream interface corresponds to the associated AP tunnel and the upstream interface is the one assigned to the client. OpenFlow is thus extended to maintain a per-client binding.

Figure 7:
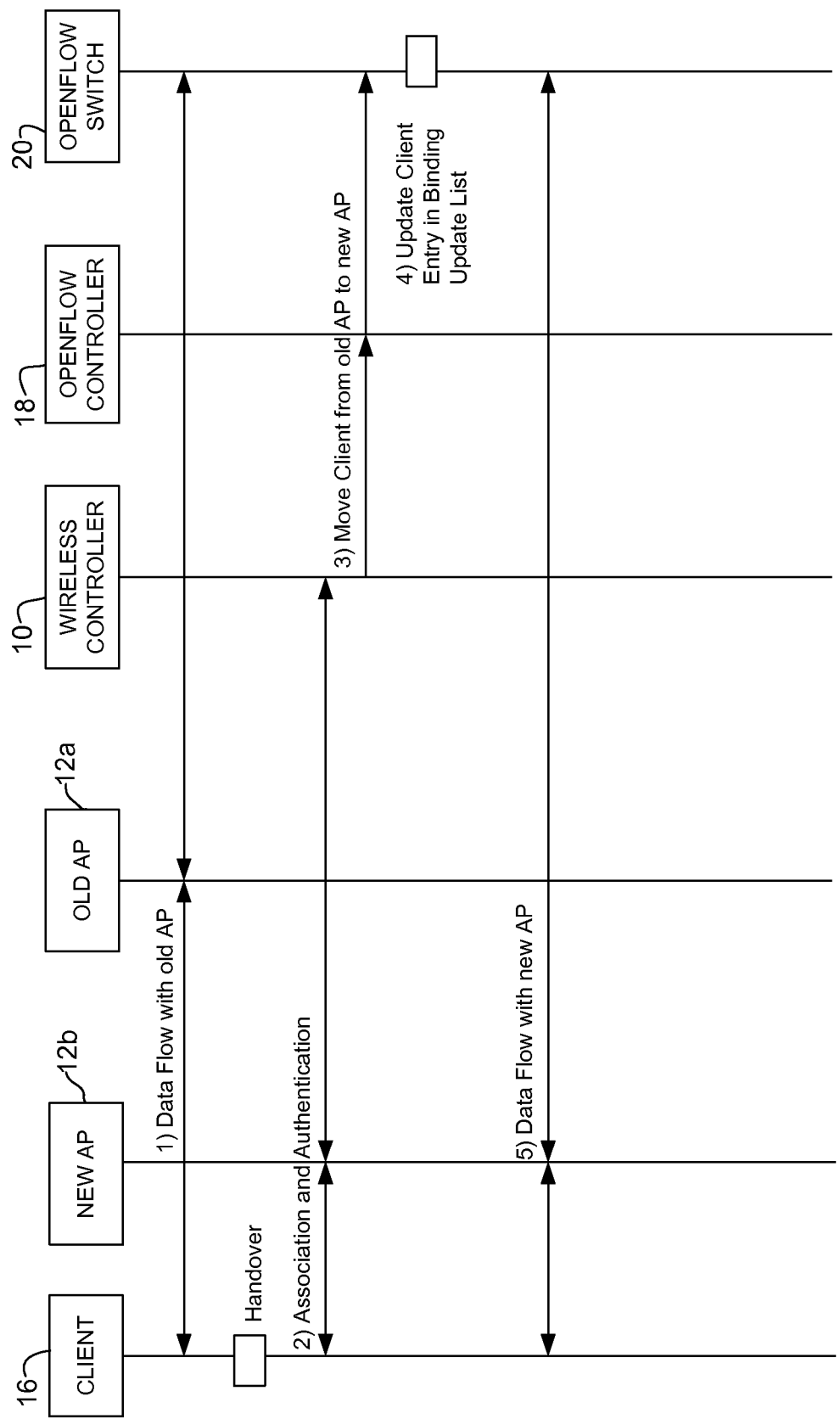
FIG. 7 is a diagram illustrating interaction between components of the wireless system during an intra-switch move, in accordance with one embodiment.

FIG. 7 illustrates intra-switch mobility (i.e., mobile device roams between two APs associated with the same switch). In a wired scenario, when a client moves between two ports of a switch, the switch learns about the move when the client sends a packet towards the switch. Wired clients typically send a packet when an Ethernet interface comes up (e.g., after a link flap). However, wireless clients often do not send any packet after connecting to a new AP following a roam.

FIG. 7 shows interaction between the client 16, an old AP 12*a* (AP to which client was originally associated with), a new AP 12*b* (AP to which client roams), the wireless controller 10, OpenFlow controller 18, and switch 20. Initially, the client 16 is in communication with the old AP 12*a* and the downstream interface of the client 16 is bound to the old AP 12*a* at the switch 20. Consequently, all traffic for the client is tunneled to the old AP 12*a*. Data flow with the old AP 12*a* is illustrated between the client 16 and old AP, and the old AP and the OpenFlow switch 20 (step 1). The client 16 performs an association with a neighboring AP (new AP) 12*b*, which is associated with the same OpenFlow switch 20. Thus, the new AP 12*b* has a tunnel with the same switch 20 as the old AP 12*a*. Association and authentication takes place after the handover (step 2). As shown in step 3 of FIG. 7, after successful association and authentication, the wireless controller 10 issues a "change-AP" command to the switch 20 providing it with the new AP identifier. The new AP 12*b* may be identified, for example, by the AP MAC address, AP IP address, or AP Tunnel Identifier. The switch 20 updates the downstream identifier for the client 16 to the one corresponding to the new AP 12*b* (step 4). All traffic to the client 16 is subsequently forwarded by the switch 20 to the tunnel to the new AP 12*b* (data flow with new AP at step 5).

Figure 8:
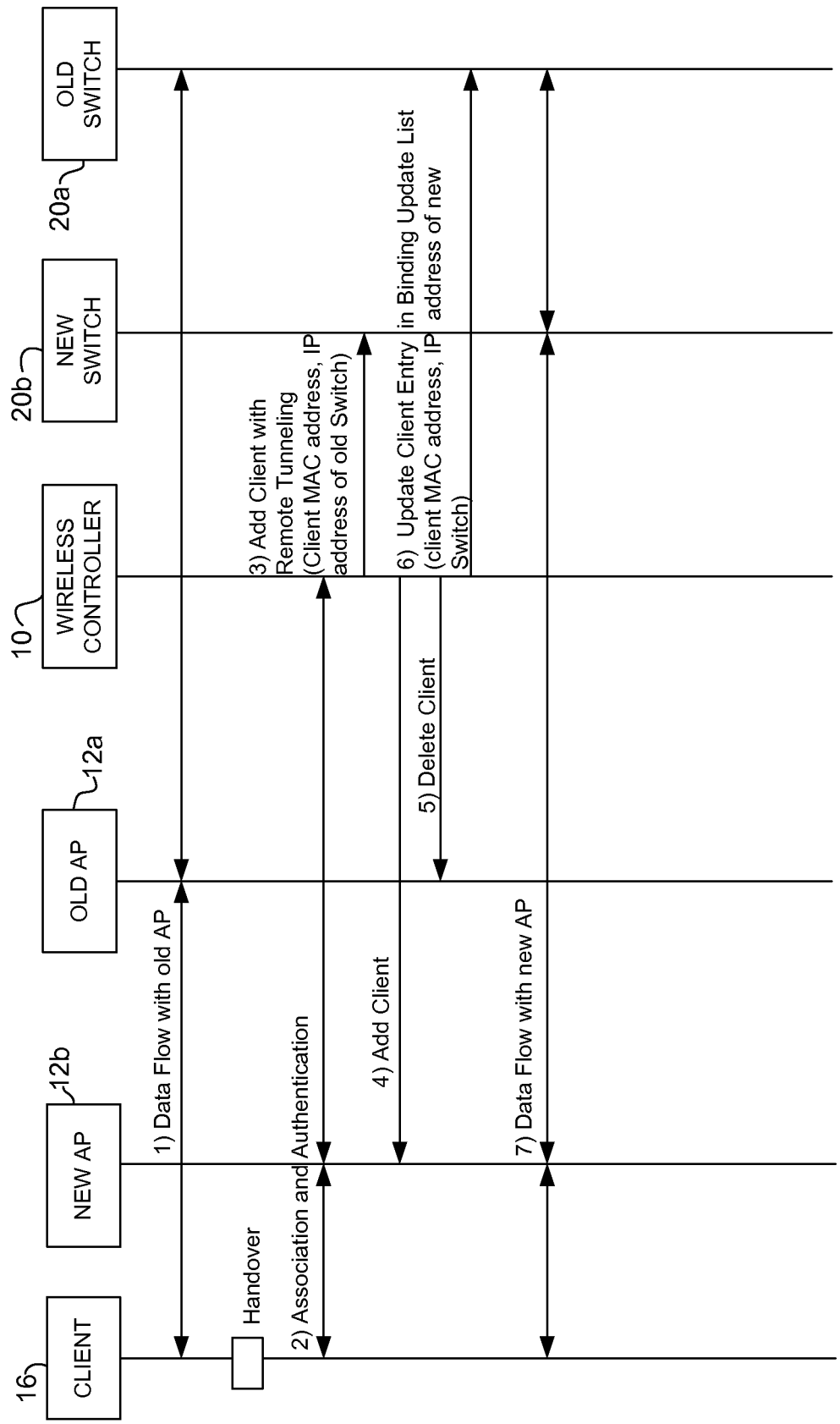
FIG. 8 is a diagram illustrating interaction between components of the wireless system during an inter-switch move, in accordance with one embodiment.

FIG. 8 illustrates inter-switch mobility (i.e., mobile device roams between two access points connected to different switches). In the example shown in FIG. 8, the client 16 roams between two APs 12*a*, 12*b* connected (i.e., having established tunnels) with two different switches 20*a*, 20*b*, respectively. The same wireless controller 10 is responsible for control plane aspects for APs connected to the two switches. At the time of system initialization, the wireless controller 10 coordinates the setting up of tunnels between switches 20*a*, 20*b*. The client 16 is initially in communication with old AP 12*a* (step 1) and moves to the new AP 12*b* (handover).

After successful association and authentication with the new AP 12*b* (step 2), the wireless controller 10 coordinates the change of data plane between the two switches 20*a*, 20*b* via the OpenFlow controller 18. As described above, the wireless controller 10 talks to the switches 20 via the OpenFlow controller 18. Thus, the steps that describe coordination between the wireless controller 10 and switch 20 or instructions from the wireless controller to the switch include the OpenFlow controller 18. The wireless controller 10 first instructs the new switch 20*b* to add the client 16 in its binding update list (step 3). The downstream identifier corresponds to the tunnel identifier of the new AP 12*b* and the upstream identifier corresponds to the tunnel identifier of the old switch 20*a*. The wireless controller 10 also instructs the new AP 12*b* to add the client 16 (step 4) and the old AP 12*a* to delete the client (step 5). The wireless controller 10 instructs the old switch 20*a* to update the client's entry in the binding update list so that the downstream identifier corresponds to the tunnel identifier for the new switch 20*b* and the upstream identifier remains the same as before (step 6). This ensures a bi-directional tunnel between the old switch 20*a* and the new switch 20*b* for the client traffic and data flow with new AP (step 7).

In another example, the client performs a layer 2 (L2) roam. In this case, the wireless controller 10 instructs the new switch to add the client 16 to its binding update list. The downstream identifier corresponds to the tunnel identifier for the new AP and the upstream identifier corresponds to the client assigned VLAN. The wireless controller instructs the old switch to delete the client's entry in the binding update list.

FIG. 9 illustrates DHCP proxy support, in accordance with one embodiment. The OpenFlow switch 20 intercepts the DHCP messages from the client 16 and sends them to the wireless controller 10 via the OpenFlow controller 18 (step 1). The switch 20 switches the DHCP Offer (and DHCP ACK) from the wireless controller 10 back to the client via the CAPWAP tunnel (step 2).

In many deployments, the controller 10 is the DHCP proxy and inserts Option 82, which is useful in determining which AP or groups of APs or SSID (service set identifier) the client is connected. In addition, the controller enables provisioning of different DHCP servers for different WLANs. Switches are typically incapable of similar functions. This motivates the need for the OpenFlow switch 20 to work with the controller 10 in a coordinated manner to alter the DHCP packets to and from the client 16.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
identifying an access point joining a wireless controller in communication with a switch;
establishing a control tunnel between the access point and the wireless controller;
transmitting an address of the switch from the wireless controller to the access point; and
requesting the switch to setup a data tunnel with the access point.

2. The method of claim 1 wherein the switch stores a tunnel identifier for the data tunnel and a list of mobile devices associated the data tunnel.

3. The method of claim 1 wherein the wireless controller communicates with the switch via a switch controller interposed in a communication path between the wireless controller and the switch.

4. The method of claim 3 wherein the switch controller and the switch communicate utilizing an OpenFlow protocol.

5. The method of claim 3 wherein the wireless controller and the switch controller are integrated in a physical network device.

6. The method of claim 3 wherein requesting the switch to setup the data tunnel comprises transmitting a message to the switch controller.

7. The method of claim 1 further comprising identifying a mobile device in communication with the access point and transmitting a request to the switch to add the mobile device to a binding table at the switch.

8. The method of claim 1 further comprising identifying an intra-switch move of a mobile device and transmitting a message to the switch identifying a new access point in communication with the mobile device for use in updating a binding table at the switch.

9. The method of claim 1 further comprising identifying an inter-switch move of a mobile device and requesting a new switch in communication with the access point to add the mobile device to a binding table, wherein the mobile device is mapped to a tunnel identifier for the new access point at a downstream interface and a tunnel identifier for the switch initially associated with the mobile device at an upstream interface.

10. An apparatus comprising:
a processor for processing instructions received at a switch from a wireless controller to setup a data tunnel with an access point joining the wireless controller, storing a tunnel identifier for the data tunnel, and associating a mobile device with the tunnel identifier; and
memory for storing a binding table comprising a list of mobile devices in communication with the switch and data tunnels for use in communication with the mobile devices;
wherein control packets are transmitted on a control tunnel between the wireless controller and the access point.

11. The apparatus of claim 10 wherein the processor is further configured to route a Dynamic Host Configuration Protocol packet to the wireless controller.

12. The apparatus of claim 10 wherein the binding table comprises a downstream interface identifier and an upstream interface identifier for each of the mobile devices.

13. The apparatus of claim 10 wherein the processor is operable to process a request from the wireless controller to add a mobile device to the binding table at the switch and map the mobile device to one of the data tunnels.

14. The apparatus of claim 10 wherein the processor is operable to process a message transmitted from the wireless controller identifying a new access point in communication with one of the mobile devices following an intra-switch roam and update the binding table at the switch.

15. The apparatus of claim 10 wherein the processor is operable to process a request transmitted from the wireless controller following an inter-switch roam of one of the mobile devices to a new switch, and update the binding table to change a downstream interface to a tunnel identifier for an inter-switch tunnel.

16. Logic encoded on one or more non-transitory computer readable media for execution and when executed operable to:
identify an access point joining a wireless controller in communication with a switch;
establish a control tunnel between the access point and the wireless controller;
transmit an address of the switch from the wireless controller to the access point; and
request the switch to setup a data tunnel with the access point.

17. The logic of claim 16 wherein the wireless controller is configured to communicate with the switch via a switch controller interposed in a communication path between the wireless controller and the switch.

18. The logic of claim 16 further comprising logic operable to identify a mobile device in communication with the access point and transmit a request to the switch to add the mobile device to a binding table at the switch.

19. The logic of claim 16 further comprising logic operable to identify an intra-switch roam of a mobile device and transmit a message to the switch identifying a new access point in communication with the mobile device for use in updating a binding table at the switch.

20. The logic of claim 16 wherein the logic is operable to generate a message following an inter-switch roam of a mobile device to the switch for use in updating a binding table at the switch to map the mobile device to an inter-switch tunnel.

* * * * *